April 29, 1958  J. P. SCHNEIDER  2,832,484
MATERIAL LOADING, PACKING AND CLOSURE
CONSTRUCTION FOR VEHICLES
Filed Feb. 25, 1957  4 Sheets-Sheet 1

INVENTOR
Joseph P. Schneider

BY
Lancaster, Allwine & Rommel
ATTORNEYS

INVENTOR
Joseph P. Schneider

April 29, 1958  J. P. SCHNEIDER  2,832,484
MATERIAL LOADING, PACKING AND CLOSURE
CONSTRUCTION FOR VEHICLES
Filed Feb. 25, 1957  4 Sheets-Sheet 3

INVENTOR
Joseph P. Schneider

BY
ATTORNEYS

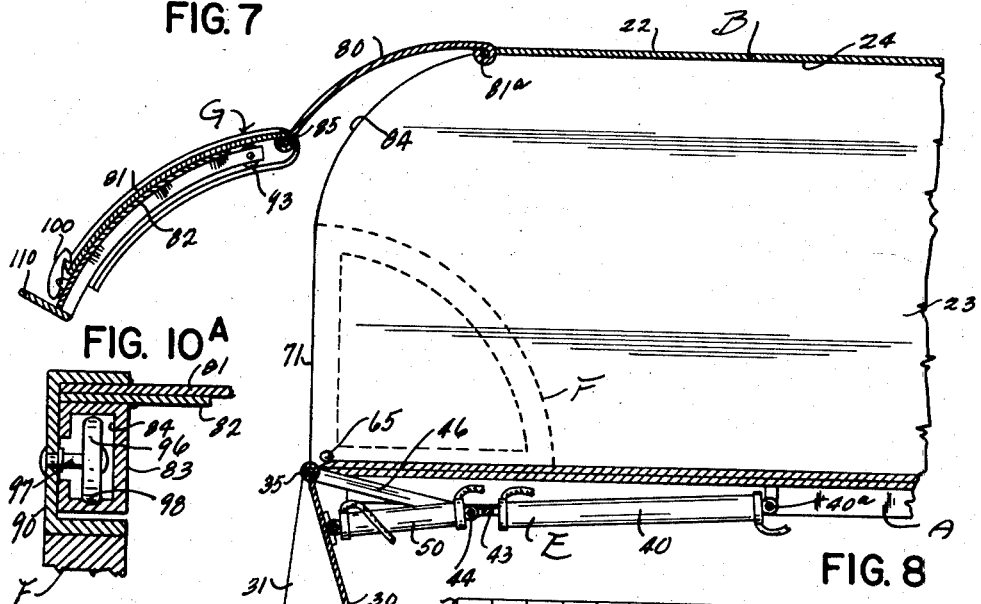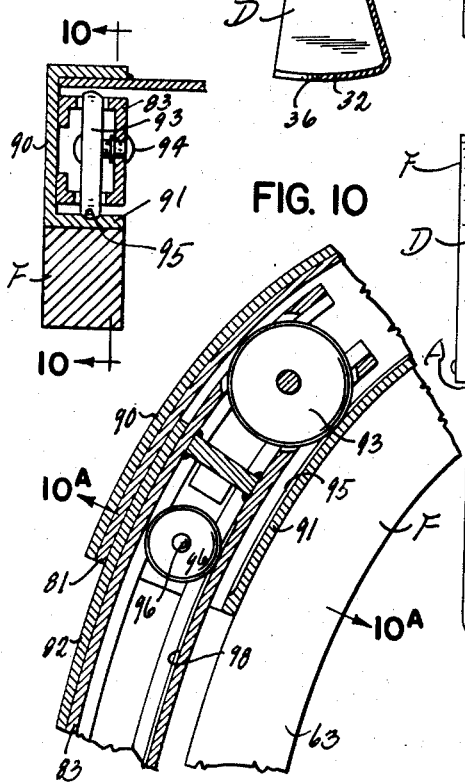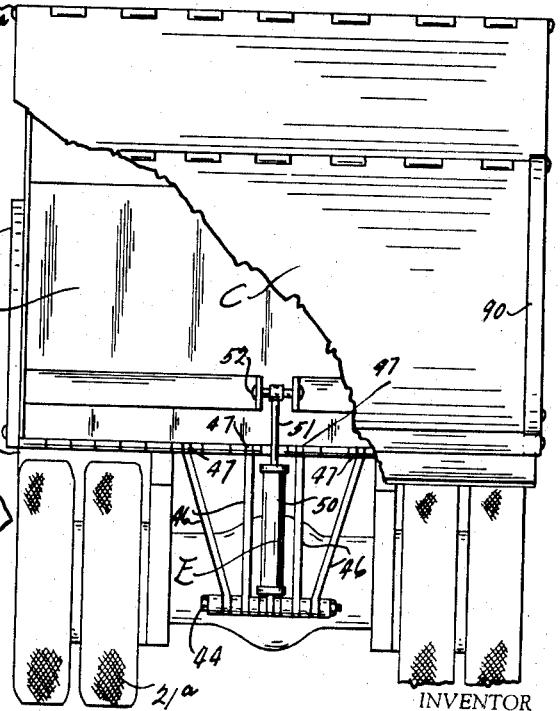

United States Patent Office 2,832,484
Patented Apr. 29, 1958

2,832,484

MATERIAL LOADING, PACKING, AND CLOSURE CONSTRUCTION FOR VEHICLES

Joseph P. Schneider, Newhall, Calif.

Application February 25, 1957, Serial No. 642,202

13 Claims. (Cl. 214—83.3)

This invention relates to improvements in material loading and hauling vehicles, with particular reference to an improved structure for quick and economical loading of loose materials such as trash and garbage.

The primary object of this invention is the provision of a rear end arrangement for material hauling vehicles including an improved bucket construction and a closure construction cooperatively associated therewith by means of which loose materials as well as cargo and large objects can with facility be loaded upon a vehicle.

A further object of this invention is the provision of an improved power actuated construction for operating material receiving, loading and packing buckets of transporting vehicles.

A further object of this invention is the provision of an improved loose material loading, packing and hauling vehicle having an improved rear gate and bucket construction which will permit of efficient collection of loose materials in a sanitary and economical manner.

A further object of this invention is the provision of an improved loose material loading, packing and hauling vehicle having improved means associated therewith to permit end as well as side loading.

Other objects and advantages of this invention will be apparent during the course of the following detailed description.

In the accompanying drawings forming a part of this specification and wherein similar reference characters designate corresponding parts throughout the several views:

Figure 7 is a longitudinal cross sectional view taken through the rear end portion of the vehicle showing the positions of the bucket and the closure construction to permit the unloading of the vehicle, as by means of a pusher packer (not shown) which could be used in the vehicle to push the loose materials through the rear opening of the vehicle.

Figure 8 is a fragmentary rear view of the vehicle with the parts in the position they will assume, as shown in Figure 4, part of the closure being broken away to show the associated mechanism of the bucket and other structure.

Figure 9 is a transverse cross sectional view, taken substantially on the line 9—9 of Figure 3, and showing more particularly the roller and guide structure of the closure parts in association with a side frame piece.

Figure 10 is a vertical cross sectional view taken substantially on the line 10—10 of Figure 9, showing more particularly an anti-friction roller arrangement which is used to guide telescopically related closure parts.

Figure 10$^a$ is a transverse cross sectional view, taken substantially on the line 10$^a$—10$^a$ of Figure 10, and showing more particularly a guide roller to facilitate guided movement of the closure or endgate parts.

Figure 11:
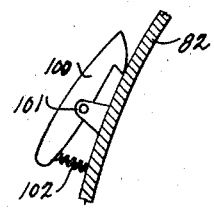
Figure 12:
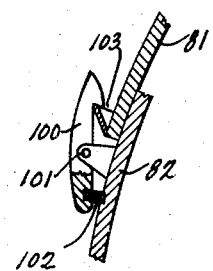

Figure 11 is a view, partly in cross section, showing a latch mounted upon a lower closure part, and Figure 12 is a cross sectional view showing the latch of Figure 11 in position engaging an upper closure section to show the mode in which the two lower closure sections are held in collapsed relation.

In the drawings, wherein for the purpose of illustration is shown only a preferred embodiment of the invention, the letter A may generally designate a vehicle chassis. It has mounted thereon a body B. An end loading, packing and closure construction C is provided in pivoted relation upon the body B cooperatively related to an improved loading and packing bucket D, preferably pivoted upon the rear end of the chassis or the body B. Power means E is provided to actuate the various positions of the bucket D as the vehicle is used for the various purposes; these different positions being shown best in Figures 2, 3, 4, 6, and 7 of the drawings. Side loading and supporting members F are provided to facilitate support of the rear end closure parts when in extended position; the same being movably connected upon either the chassis or the body portion B in a manner to be subsequently described. The structure C preferably includes a telescopically related closure or canopy arrangement G.

Figure 4:
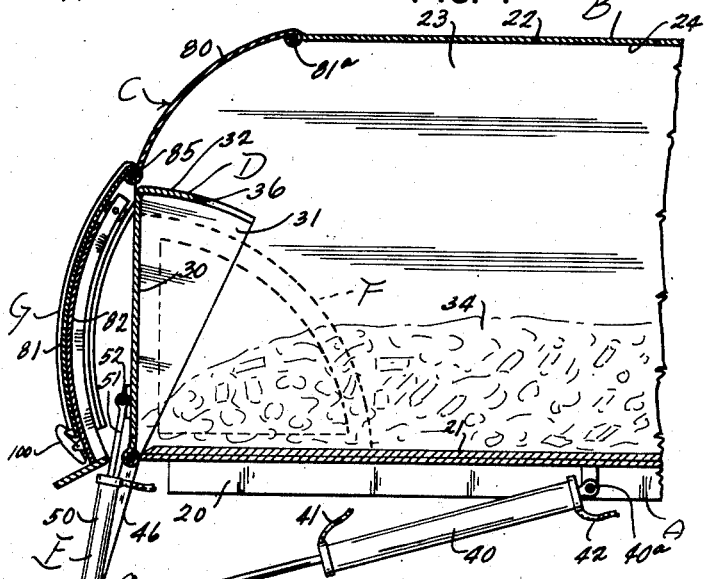
Figure 4 is a fragmentary longitudinal cross sectional view showing the parts of Figures 2 and 3, but with the bucket located within the vehicle and the closure construction in shut position, such as the parts assume during travel of the vehicle.
Figure 6:
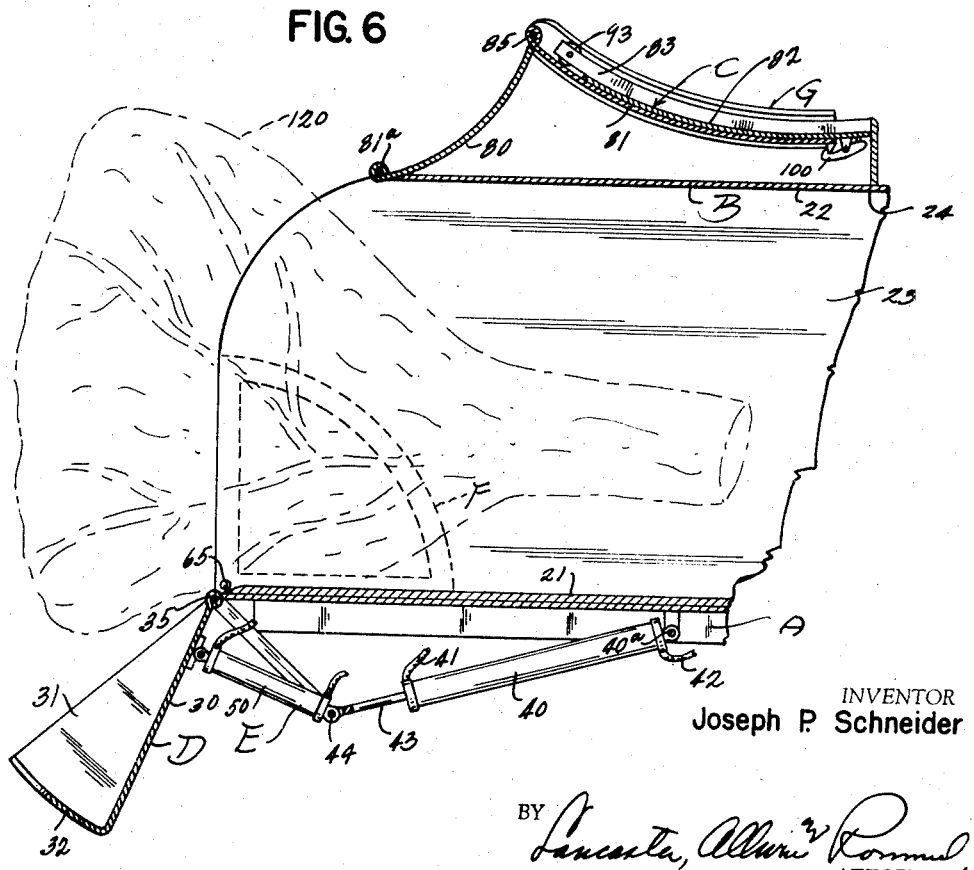
Figure 6 is a longitudinal cross sectional view of the rear end of the vehicle, taken through the bucket and closure features showing them in position such as they would occupy to widely open the rear end of the compartment of the vehicle for disposal therein of such large objects as the root system of a tree, etc.

The chassis A may be of any approved type, including a frame structure 20 supported by conventional running gear 21$^a$. Upon the frame 20 is mounted a body B which may include a floor or deck 21; roof 22 and side walls 23. Body B may have a closed front wall (not shown) and associated within the chamber 24 may be a conventional packer (not shown) movable fore and aft for the purpose of manipulating the materials in the chamber 24 and discharging them through the rear open end of the body B. The chamber 24 is provided with a rear opening for cargo loading and discharging purposes. It is shown in Figure 6 that the cross sectional area of the chamber 24 may be completely exposed, or completely closed as shown in Figure 4.

Referring to the bucket D, the same includes a base or platform wall 30 having triangular shaped side walls 31 connected thereto, at each side thereof and a rear preferably vertically arched wall 32. In loading position the base 30 will be slightly sloped downwardly to the rear with the side walls 31 upstanding and vertically positioned. The end wall 32 defines, together with the other walls, a chamber adapted to receive loose materials 34 (Figure 2) such as trash or garbage. The bucket D extends from side to side of the vehicle and has a hinged connection at 35 upon the chassis frame, preferably slightly below the level of the top surface of the floor or deck 21. Its length, that is in dimension paralleling the longitudinal axis of the vehicle, is such that when in elevated position (see Figures 3 and 4) the bucket D will occupy less than the entire height of the end opening of the chamber 24, preferably slightly greater than one-half of such height. The convex rear wall 32 of the bucket D is recessed, as shown at 36 in Figure 5 of the drawings, that is the wall 32 is of less depth intermediate its ends than at its ends; such recess enabling efficient loading of materials in the chamber of the bucket D (see Figure 5).

The power means E for actuating bucket D and holding it in its various positions, preferably consists of a double acting hydraulic cylinder 40 pivoted at 40a to the chassis and having the usual fluid conveying hose 41 and 42 at the ends thereof; said cylinder having therein a conventional piston (not shown) and a piston rod 43. The piston rod 43 at its rear end is pivotally connected to a shaft or pintle 44 which is horizontally supported by means of a pivoted frame and bracket arrangement 46; the upper end of the latter being pivotally connected at 47 on preferably the same pivot axis as the pivot 35 of the bucket D. This frame 46 is intended to hold the axes of the pivots 35 and 44 at a uniform distance during all positions of the buckets. It may consist of a plurality of vertical and diagonal rods having the pivotal connections above described and as more specifically shown in Figure 8.

The power means E also includes a second and preferably shorter double acting hydraulic cylinder 50 pivotally connected at one end to the pintle 44. At its other end it has an extensible piston rod 51 which is pivoted at 52 upon the bottom or base wall 30 of the bucket D, at a location spaced rearwardly from the pivot pin 35 (see Figure 2). The cylinder 50 is double acting, having the usual piston (not shown) and fluid hose connections 53 at the ends thereof.

The valve and control means for operating the hydraulic cylinders 40 and 50 is not shown, but may be actuated and powered off of the transmission mechanism of the vehicle or controlled by other independent and conventional means.

Figure 2:
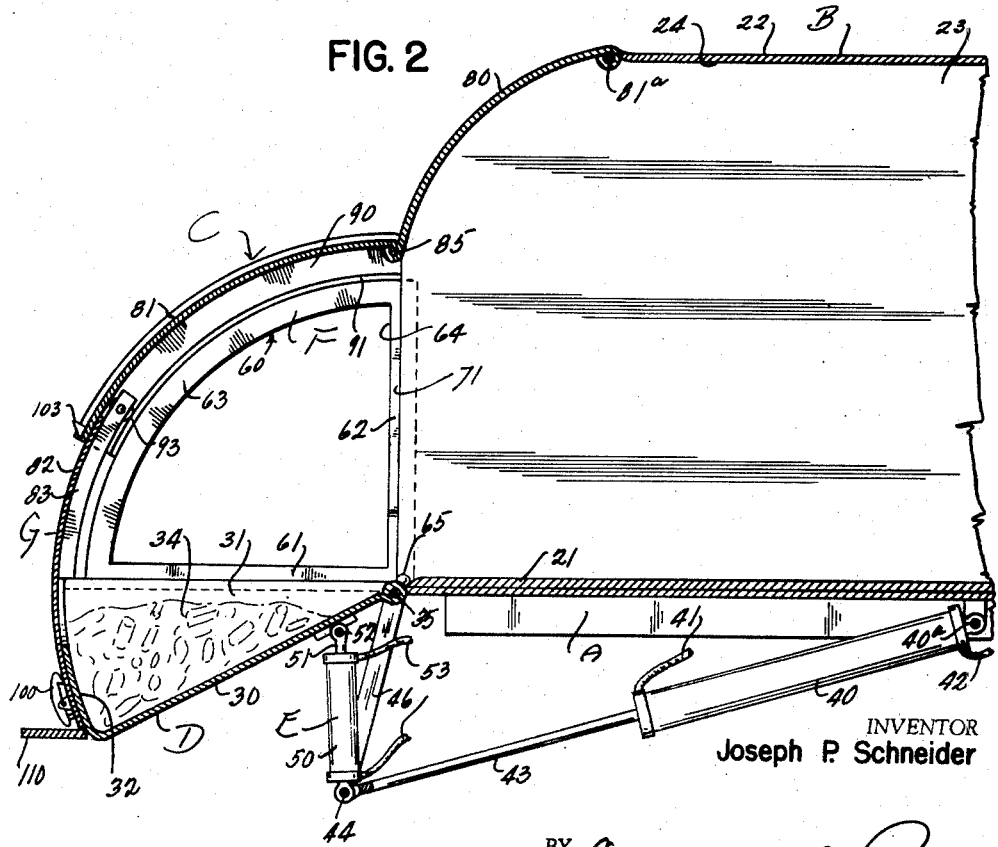
Figure 2 is a fragmentary longitudinal cross sectional view taken through the rear end of the vehicle including closure and bucket structure and associated power actuating means for the bucket, in the relative positions shown in Figure 1.
Figure 3:
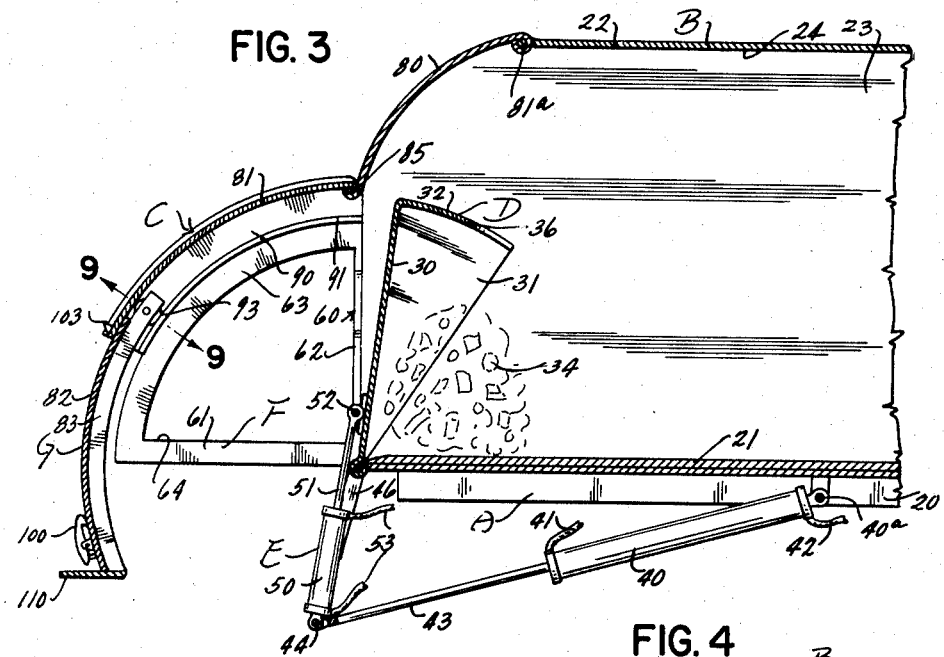
Figure 3 is a longitudinal cross sectional view of the parts shown in Figure 2, but arranged to show the mode of dumping of materials onto the deck or floor of the vehicle.

The side members F are intended principally to be used as supports for the closure structure G when in rearwardly extended position, as shown in Figures 2 and 3. Each comprises an open work frame 60 substantially triangular in shape, including the straight line right angled rear rails 61 and 62, and an arcuate rear rail 63 which in effect forms the hypotenuse of the triangle. Each side piece F has a very large opening 64 through which side loading of loose materials into the bucket D can be effected. These frame members F are preferably pivoted at 65 to the side walls 23 of the body B and will swing fore and aft. In its rear or extended position, as shown in Figures 2 and 3, a detent extension 66 on each of the same engages with a stop pin 67 upon the body B to limit extension and downward movement of the frame F when extended. The frame pieces F may be completely collapsed externally upon the side walls 23 of the body B as shown in the dotted line positions of Figures 4 and 7, and in which positions the outer edges of the rail portions 62 will rest upon a ledge 70 of the chassis frame A or some other suitable expedient may be provided to hold the collapsed or fore positions of the members F. When in fore positions, it is to be noted that members F are completely collapsed forwardly of the rear edges 71 of the side walls 23 of body B. This permits closing of the door or canopy arrangement G, which actually is supported by the members F when extended.

Referring to the compound closure structure G, the same includes an upper closure portion 80, an intermediate closure portion 81 and a lower closure portion 82. All of them are cancavo convex in vertical cross section. The closure section 80 is pivoted at 81a upon the top of the body B at the rear end of the roof structure 22 and in position appreciably forward of the vertical rear edges 71 of the lower portions of the body walls 23. The upper rear edge 84 of the body wall 23 is arcuated (see Figure 7) to conform to the curvature of the closure section 80.

The intermediate closure or canopy section 81 is cancavo convex in vertical cross section and is pivoted at 85 upon the lower margin of the upper closure section 80, on a fixed pivot. The arc from which the closure 81 is struck has the same center as the arc from which the outermost arched edges of the side members F is struck.

The lower closure section 82 is arcuate in vertical section; the arc from which struck having the same center as the arc from which the closure section 81 is struck. The intermediate section 81 and the lower section 82 are telescopically and slidably connected together by an anti-friction roller construction which is best shown in the cross sectional views of Figures 9, 10 and 10a.

The intermediate closure portion 81 at the sides thereof is provided with welded or otherwise secured trackway channels 90, each of which has a channel groove facing inwardly to movably receive therein a similar channel 83 which is welded or otherwise secured upon each of the outer margins of the lower closure portion 82; the channel groove 84 thereof facing outwardly.

Anti-friction means is provided to prevent binding of the telescopic sliding of the channel portions 83 and 90. To that end I have provided an anti-friction roller 93 rotatably supported upon a shaft 94 secured to the channel 83; the upper and lower flanges of the channel 83 being slotted in order that the roller 93 peripherally extends into position for riding upon the lower flange 91 of the channel 90, as shown in Figure 9, and preferably in a trackway groove 95 therein. Similarly a roller 96 is rotatably supported upon a shaft 97 attached to the outer side wall of the channel 90, as shown in Figure 10a, a portion of which rides upon the lower flange of the smaller channel 83 and preferably in a trackway groove 98 thereof. This channel and anti-friction roller assemblages are provided upon each side of the closures 81 and 82. It can readily be seen with what ease the lower section 82 can be lifted upwardly and collapsed upon and beneath the closure 81 from the position of the lids shown in Figures 2 and 4.

It should be noted from Figures 9 and 10a that the lower flanges of the channels 90 of the closure 81 will rest upon the convex edge of the rail 63. This stabilizes the closure sections in extended position, when the side pieces F are also extended.

A spring actuated latch 100 is pivoted at 101 upon the upper portion of the lower closure 82, spring urged at 102 into position for normally camming against and engaging a keeper 103 provided upon the lower marginal portion of the intermediate closure section 81. The normal position is shown in Figure 11 but its engagement with the keeper is shown in Figure 12. In the latter position the two lower closures 81 and 82 will be held telescoped in the relation shown in Figure 7.

It should be noted from Figure 2 that when the closures 80, 81 and 82 are rearwardly extended to the positions shown in Figure 2, the lower portion of the closure 82 will abut the wall 32 of the bucket B, although some roller or other anti-friction means may be provided to enable movement of the bucket D without disturbing the positions of the closures 80, 81 and 82 such as when the bucket is moved to a fully loaded position into the vehicle for dumping the contents into the vehicle body.

I prefer to provide a foot rail 110 in securely welded or otherwise secured position upon the lower margin of the closure 82, upon which employees may stand for riding as the vehicle is being moved from one location to another.

Figure 1:
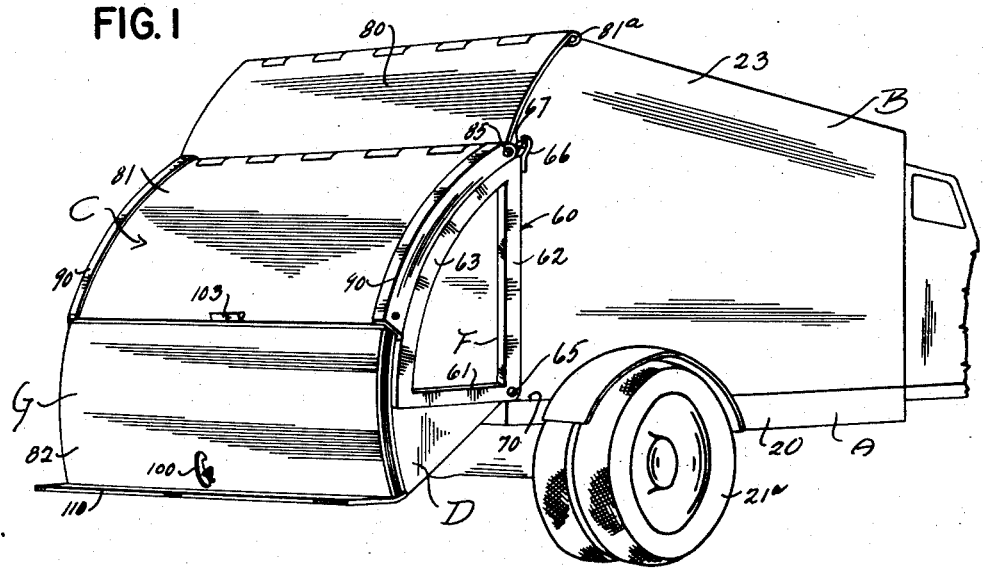
Figure 1 is a fragmentary perspective view of the improved vehicle, taken from the rear, showing more particularly the improved rear closure and bucket construction in extended relation to permit side loading of loose materials.

Referring more specifically to the various loading and other positions of the bucket D, it is shown lowered in Figures 1 and 2 for side loading with the lower closure 82 completely shut. In this position the bucket D has the top edges of the walls 31 about horizontally positioned. From this position the power mechanism E is operated through the hydraulic cylinders above described for dumping and packing purposes to the position shown in Figure 3; it merely being necessary to actuate the hydraulic cylinder 50 for this operation, and the bucket may again be lowered for loading.

Figure 5:
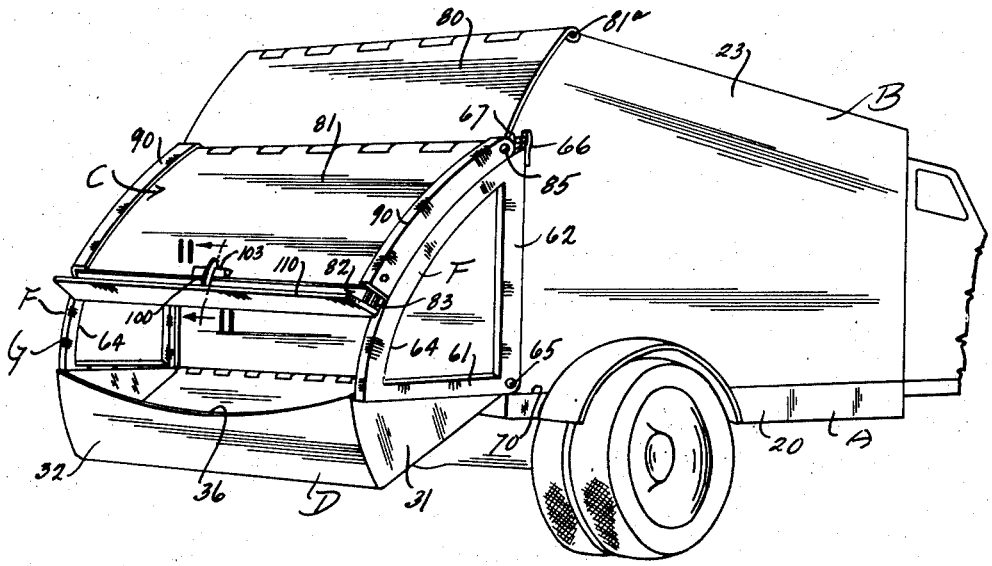
Figure 5 is a perspective view of parts of the rear end structure of the vehicle, as shown in Figure 1, but with a closure opened to permit rear end and side loading.

For end loading, it is merely necessary to collapse the lower closure section 82 upon the intermediate closure section 81 to the position shown in Figure 5. Thus the chamber of the bucket is exposed for end loading. In this position, the latch mechanism 100 will hold the two closures 81 and 82 collapsed.

If it is desired to load the body B with some large cargo or other materials, such as the root system 120 of a tree, shown in dot and dash lines in Figure 6 of the drawings, the power mechanism E is actuated to lower the bucket D so that it extends downwardly either in the position shown in Figure 7 or the diagonal position shown in Figure 6, and the compound closure construction G will be swung upwardly in supported relation upon the roof 22 of the body D, as shown in Figure 6, thus fully exposing the rear opening to the chamber 22.

For discharging contents of the body B, it is within contemplation of the invention to use a conventional packet of the piston type. It will push the materials rearwardly and out of the rear opening of the body B, from the chamber 22. In such event the bucket D is lowered as shown in Figure 7 and the materials themselves, as they are discharged, will force the closure portion G into the upward position, as shown in Figure 7. If desired some bracket means may be provided for holding the closure construction G in the position shown in Figure 7.

In the specification and claims the word body is broadly intended to mean part of the vehicle and chassis so far as connections of the side members, closures and bucket are concerned.

Various changes may be made to the invention herein shown and described without departing from the spirit of the invention or scope of the claims.

I claim:

1. In a loose materials loading, dumping and transporting vehicle, the combination of a vehicle chassis having a body mounted thereon provided with a chamber opening at the rear end thereof, a compound closure construction pivoted upon the body at the top rear thereof for closing the rear opening of the chamber and extensible rearwardly therefrom, side members movably mounted upon the vehicle body at the lower rear end thereof at each side of the vehicle and movable into collapsed positions along the sides of the body and rearwardly extensible therefrom to the rear of the body in position to support the closure construction when in rearwardly extended position, and a loading and dumping member movably mounted upon the lower rear portion of said body operable below the closure construction when the latter is extended for loading and dumping movements.

2. A vehicle as described in claim 1 in which the side members are provided with openings therein for side loading of the loading and dumping member.

3. A vehicle as described in claim 1 in which the compound closure construction includes a lower section movable upwardly to expose the loading member at the rear of the body for rear loading.

4. A vehicle as defined in claim 3 in which the side members are provided with lateral openings therein for side loading of the loading and dumping member.

5. In a rear end closure and loading construction for vehicles the combination of a vehicle having a body provided with a chamber therein, a bucket movably mounted rearwardly upon the lower portion of the body, means for extension of the bucket rearwardly therefrom for loading and for movement therefrom to an upright forwardly inclined position for dumping its load into the chamber of the body, and an articulated closure construction including an upper closure section pivoted in the upper part of the body above the bucket, an intermediate closure section pivoted to the lower portion of the upper closure section, and a lower closure section collapsibly and extensibly mounted upon the lower portion of the intermediate closure section.

6. In a material receiving and loading construction for vehicles the combination of the vehicle body having a chamber therein, a bucket pivoted upon the lower rear portion of the body, extensibly rearwardly therefrom for loading, and having a chamber therein opening upwardly when the bucket is rearwardly extended, the bucket being mounted for moving upon the body from said loading position for dumping its contents into the chamber of the body, the bucket being mounted for downward extension to completely open the body chamber to the rear, and power means for moving the bucket and holding the bucket in any of the aforesaid positions, said power means comprising a hydraulic cylinder assemblage pivoted to the bucket at one end and a second hydraulic cylinder assemblage pivoted to the first mentioned cylinder assemblage at its other end and said second assemblage being pivoted to the vehicle body at its other end.

7. In a loose materials loading, dumping and transporting vehicle, the combination of a vehicle body provided with a chamber opening at the rear end thereof, a loading bucket having a chamber therein and an opening thereto, means pivotally mounting the loading bucket upon the lower rear of the body for free swinging from a completely dependent portion to an upwardly extended position for dumping materials into the body chamber, said bucket when in dumping position being substantially collapsed within said body chamber, power means for moving the bucket to its various portions, an articulated closure construction pivoted upwardly upon the body at the rear thereof and retractable to a closed collapsed position upon the rear of the body when the bucket is positioned within the chamber of the body, and means for holding said closure construction in rearwardly extended protecting relation with respect to said bucket when said bucket is in loading position.

8. A vehicle construction as defined in claim 7, wherein the power means for manipulating the bucket comprises a lever type frame pivoted to the lower rear of said body, a hydraulic piston and cylinder assembly pivoted at one end to said body rearwardly of the pivot of said lever frame upon the body, and at its opposite end pivoted to the lever frame remote from said frames pivot mounting on the body, and a second hydraulic piston and cylinder assemblage pivoted at one end to the pivot axis connection of the first mentioned hydraulic assemblage with the lever frame and at its opposite end being pivotally connected to said bucket spaced from the pivot mounting of the bucket upon said body.

9. In a vehicle for loading, dumping and transporting loose materials, the combination of a body construction having a chamber therein and a rear opening to said chamber, an articulated closure construction for said rear opening including a top section pivoted to the upper part of said body above the rear opening, an intermediate section pivoted to the free end of the upper closure section for rearward and forward swinging with respect to said upper closure section, and a lower closure section collapsibly and extensibly mounted for movement upon the intermediate section, and power actuated bucket loading means connected to the body construction for movement to rearward extended loading relation upon the body with respect to said opening and for unloading positioning for dumping of its contents into the chamber of the body construction.

10. A vehicle construction as defined in claim 8, in which side supporting members are movably connected upon said body construction for rearward extension from the body beyond the rear opening for supporting the closure construction intermediate and lower sections, said members being collapsible to a forward position on the body portion with respect to the rear opening whereby the closure construction will collapse compactly and closely over said body rear opening.

11. A vehicle construction as defined in claim 9, in which said side supporting members are provided with material charging openings transversely therethrough for loading said materials into said bucket when said members are rearwardly extended.

12. A vehicle construction as defined in claim 5 in which side members are movably mounted upon the body construction at the lower rear portion thereof rearwardly extensible from the body for supporting the intermediate and lower closure sections in rear closure extended positions.

13. In a material loading, transporting and dumping vehicle, the combination of a chassis having a body mounted thereon provided with a chamber therein opened rearwardly, a bucket movably mounted upon the rear lower end of the body having means for its support in various positions including a loading position extended rearwardly from the body and an upright dumping position to internally dump material into the body chamber, a compound closure construction movably mounted upwardly upon the body and complementary to the bucket construction extensible rearwardly from the vehicle for closing the rear end of the vehicle, said closure construction including a lid portion movable to expose the bucket when extended for rear loading, and side members movably mounted upon the body of the vehicle for collapsed forward extension at the sides thereof and rearwardly extensible with respect to the closure construction for supporting the closure construction when rearwardly extended, said side members having side loading openings therein positioned to enable loading of the bucket from the sides of the vehicle.

References Cited in the file of this patent

UNITED STATES PATENTS

| 2,299,368 | Wood | Oct. 20, 1942 |
| 2,748,964 | Murphy | June 5, 1956 |

FOREIGN PATENTS

| 766,045 | France | Apr. 9, 1934 |
| 959,523 | France | Oct. 3, 1949 |
| 140,876 | Sweden | June 16, 1953 |